United States Patent
Katagiri

(10) Patent No.: US 7,679,064 B2
(45) Date of Patent: Mar. 16, 2010

(54) PARTICLE DETECTOR AND NEUTRON DETECTOR THAT USE ZINC SULFIDE PHOSPHORS

(75) Inventor: Masaki Katagiri, Ibaraki-ken (JP)

(73) Assignee: Japan Atomic Energy Research Institute, Kashiwa (JP)

(*) Notice: Subject to any disclaimer, the term of this patent is extended or adjusted under 35 U.S.C. 154(b) by 30 days.

(21) Appl. No.: 11/104,655

(22) Filed: Apr. 13, 2005

(65) Prior Publication Data
US 2006/0011854 A1 Jan. 19, 2006

(30) Foreign Application Priority Data
Apr. 15, 2004 (JP) .............................. 2004-120790

(51) Int. Cl.
G01T 3/06 (2006.01)
(52) U.S. Cl. ............................................... 250/390.11
(58) Field of Classification Search ................. 250/367, 250/368, 390.11
See application file for complete search history.

(56) References Cited

U.S. PATENT DOCUMENTS

| | | | | | |
|---|---|---|---|---|---|
| 3,872,222 | A | * | 3/1975 | Barnes .......................... | 117/68 |
| 4,740,699 | A | * | 4/1988 | Miura et al. .................. | 250/586 |
| 4,906,893 | A | * | 3/1990 | Homma et al. ............... | 313/525 |
| 5,277,841 | A | * | 1/1994 | Jeong et al. ............. | 252/301.6 S |
| 6,313,465 | B1 | * | 11/2001 | Nittoh et al. ............ | 250/370.11 |
| 6,471,888 | B1 | * | 10/2002 | Mihalczo et al. ........ | 252/301.17 |
| 6,479,829 | B1 | * | 11/2002 | Katagiri .................... | 250/484.5 |
| 6,495,837 | B2 | * | 12/2002 | Odom et al. ............ | 250/390.11 |
| 6,721,389 | B2 | * | 4/2004 | Van Der Werf et al. ....... | 378/34 |
| 7,138,633 | B1 | * | 11/2006 | Rozsa et al. ................. | 250/368 |
| 2003/0178574 | A1 | * | 9/2003 | Wallace et al. .......... | 250/390.11 |

FOREIGN PATENT DOCUMENTS

| | | |
|---|---|---|
| JP | 10-274675 | 10/1998 |
| JP | 11-118933 | 4/1999 |
| JP | 2002-6055 | 1/2002 |
| JP | 2002-80847 | 3/2002 |
| JP | 2002-141280 | 5/2002 |
| JP | 2002-360554 | 12/2002 |
| JP | 2004-45250 | 2/2004 |

OTHER PUBLICATIONS

Herbert et al. A compact PET detector array using wavelength shifting fibres, 1999 IEEE Nuclear Science Symposium Conference Record, vol. 3 (Oct. 1999), pp. 1304-1308.*

Usuda et al., "Simultaneous Counting of Radiation Emitted from Actinides with Improved Phoswich Detectors by Applying an Optical Filter", Journal of Alloys and Compounds, 1998; pp. 58-61.

Usuda et al., "Development of Phoswich Detectors for Simultaneous Counting of Alpha Particles and Other Radiations (Emitted from Actinides)", Appl. Radiat. Isot. vol. 49, 1998; pp. 1131-1134.

Japanese Office Action issued Jun. 15, 2009 in corresponding Japanese Patent Application 2004-120790.

* cited by examiner

*Primary Examiner*—David P Porta
*Assistant Examiner*—Shun Lee

(57) ABSTRACT

The characteristics of the phosphor ZnS:Ag,Cl which has a considerably high fluorescence yield in response to incident particles thus allowing for their easy detection are used as such and combined with the finding that the fluorescence components in the range of shorter wavelengths are short-lived, which led to an improvement of counting characteristics, hence allowing for high-rate measurements of particles. When B370 was used as an optical filter to pick up fluorescence components shorter than 450 nm, the decay time of short-lived fluorescence components could be reduced from 370 ns to 200 ns.

1 Claim, 7 Drawing Sheets

PHOSPHOR ZnS:Ag,Cl AS NEUTRON SCINTILLATOR
OPTICAL FILTER FV026
PHOTOMULTIPLIER TUBE

PARTICLE DETECTOR AND NEUTRON DETECTOR THAT USE ZINC SULFIDE PHOSPHORS

BACKGROUND OF THE INVENTION

The present invention relates to an improvement in the counting characteristics of a particle detector and a neutron detector that use ZnS phosphors.

Conventional detectors of particles such as alpha particles or conventional neutron detectors which detect neutrons indirectly by detecting the particles emitted from the neutron converter $^6$Li or $^{10}$B have in most cases used ZnS phosphors since they have considerably high fluorescence yields in response to incident particles and the short-lived components of fluorescence have decay times of only 200-300 ns.

However, the fluorescence from ZnS phosphors contains the long-lived components that contribute "afterglow" effects as shown in FIG. 12. Hence, the mean life of fluorescence from ZnS phosphors is said to range from 70 to 100 μs. On account of those long-lived components, the incidence of high-rate particles or neutrons can cause a "pile-up" of pulses, making it difficult to measure accurate counting rates (see Hoshasen Handbook, 2nd Ed.)

As the operation of the high-intensity pulsed neutron source using a high-intensity proton accelerator has made a progress in recent years, the ranges of the intensity of pulsed neutrons and the neutron energy produced have both expanded and it is now essential to develop a detector that is capable of convenient neutron detection and two-dimensional neutron imaging without being saturated even if neutrons are incident at high rates. Measurement of particles at high counting rates is also essential in experiments using an accelerator or a nuclear reactor. In the measurement of neutrons or particles, they must be detected with reduced effects of gamma rays as the background. Detection of particles with the least possible quantities of gamma rays as the background is also indispensable to observations of dark matter or cosmic rays.

SUMMARY OF THE INVENTION

In the present invention, the characteristics of ZnS phosphors such as ZnS:Ag and ZnS:Cu which have considerably high fluorescence yields in response to incident particles thus allowing for their easy detection, are used as such and combined with the finding of the present inventors that the fluorescence components in the range of shorter wavelengths are short-lived. This led to an improvement of counting characteristics, allowing for high-rate measurements of particles or neutrons.

In addition, in order to detect particles or neutrons as distinguished from gamma rays or electron beams, another finding of the present inventors was utilized, that was, those components of the fluorescence emitted from the phosphor ZnS:Ag,Cl which were in the range of shorter wavelengths had lower yields of fluorescence in response to gamma rays or electrons than to the incident particles.

DESCRIPTION OF THE PREFERRED EMBODIMENTS

The present invention is described below in detail with reference to examples.

EXAMPLE 1

In this example, a particle detector using the phosphor ZnS:Ag,Cl as a particle detecting element is described with reference to FIG. 1.

Figure 1:
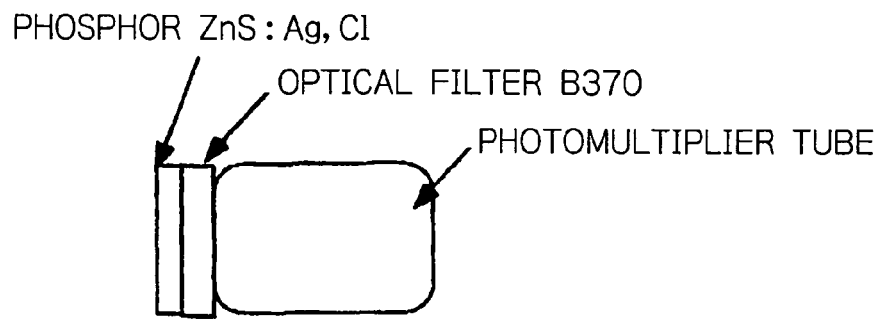
FIG. 1 shows a particle detector comprising ZnS:Ag,Cl which is a particle detecting element coupled to the optical filter B370 which passes wavelengths shorter than about 450 nm and which in turn is coupled to a photomultiplier tube.

The particle detector shown in FIG. 1 comprises ZnS:Ag, Cl as the particle detecting element coupled to the optical filter B370 which passes wavelengths shorter than about 450 nm and which in turn is coupled to a photomultiplier tube.

Figure 2:
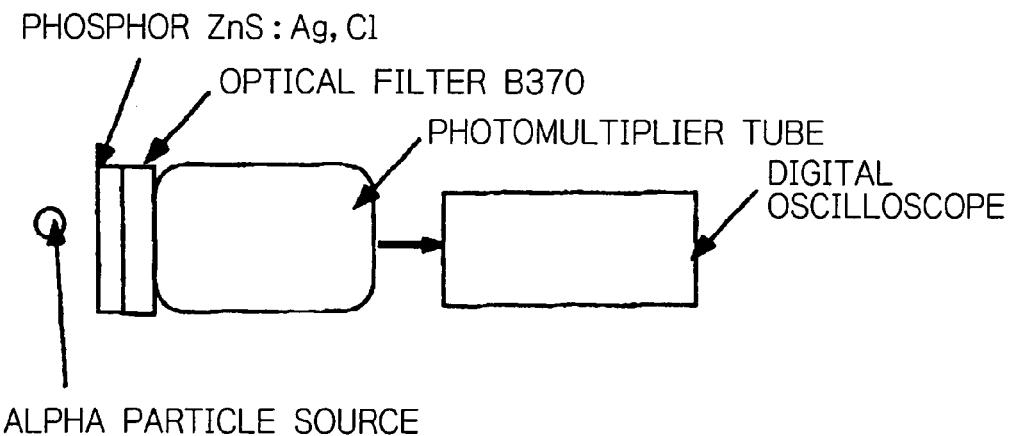
FIG. 2 shows a circuit for measuring the wavelength dependency of the life of fluorescence from ZnS:Ag,Cl.

The wavelength dependency of the life (decay time) of fluorescence from ZnS:Ag,Cl was measured with a circuit shown in FIG. 2. The particle source was Am-241 emitting alpha particles of 5.4 MeV. The phosphor ZnS:Ag,Cl was mixed with an organic adhesive and applied to a glass plate in an amount of 5 mg/cm$^2$. Thereafter, the fluorescence emitted from ZnS:Ag,Cl was selectively passed through various optical filters having different transmission wavelength ranges and detected with a photomultiplier tube (R647P of HAMAMATSU PHOTONICS K.K.) The waveforms of output signals were measured with a digital oscilloscope. The measured signal waveforms were analyzed to determine the decay time of fluorescence. The results are shown in Table 1. For determining the decay time of fluorescence, 0.8 μs was used as the range for analysis. It was verified that the fluorescence components of shorter wavelengths had shorter decay times.

TABLE 1

Decay time Characteristics of Fluorescence in the Presence of Optical Filters Having Different Transmission Wavelength Ranges

| Optical filter | Transmission range | Decay time (ns) |
|---|---|---|
| None | | 362 |
| FV026 | 380-420 nm | 125 |
| B370 | 350-450 nm | 176 |
| B390 | 350-470 nm | 258 |
| Y440 | ≧440 nm | 418 |

Figure 3:
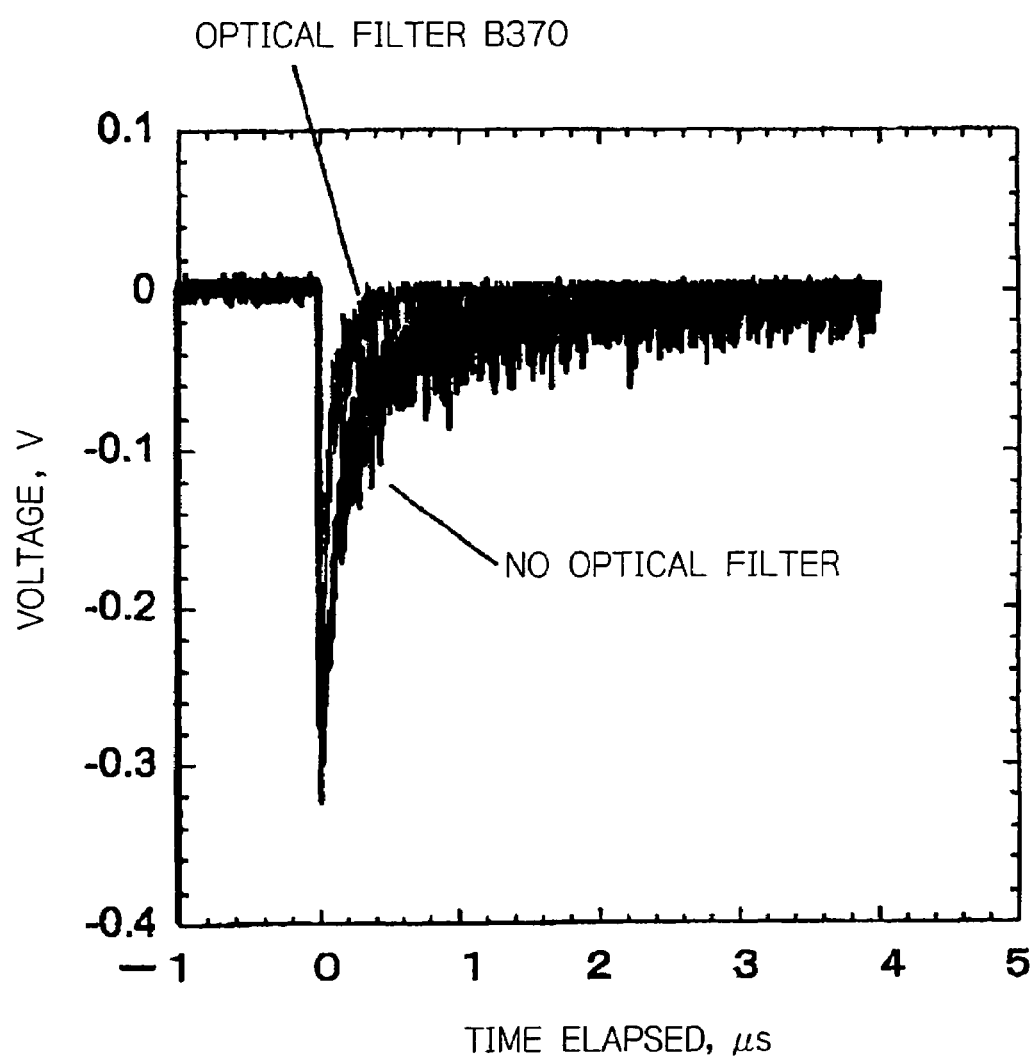
FIG. 3 is a graph comparing the waveforms of output signals from the photomultiplier tube in response to incident particles on ZnS:Ag,Cl between two cases, one using B370 as an optical filter and the other case using no optical filter.

Thus, in Example 1, B370 passing shorter wavelengths than about 450 nm was used as an optical filter in order to shorten the decay time of fluorescence without unduly reducing its yield. As is clear from the signal waveforms shown in FIG. 3, the decay time of fluorescence was 176 ns, a considerable improvement over the value of 362 ns which was observed when no optical filter was used. The same experiment was conducted with the phosphor ZnS:Ag,Al and the decay time was 292 ns, a considerable improvement over the value of 421 ns which was observed when no optical filter was used.

EXAMPLE 2

In this example, a neutron detector is described with reference to FIG. 4. A mixture of the phosphor ZnS:Ag,Cl with the neutron converter $^6$LiF was used as a neutron detecting scintillator and the short decay time of the short-wavelength component of fluorescence from the scintillator was utilized to improve the counting characteristics of the detector.

Figure 4:
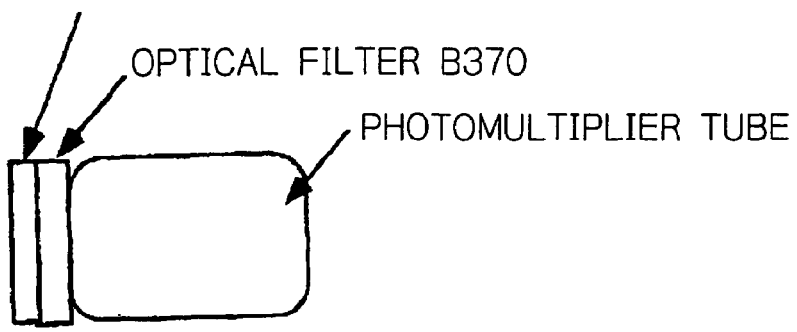
FIG. 4 shows a neutron detector comprising a neutron detecting scintillator which is a mixture of the phosphor ZnS:Ag,Cl with the neutron converter $^6$LiF and which is coupled to the optical filter B370 which passes wavelengths shorter than about 450 nm and which in turn is coupled to a photomultiplier tube.

The neutron detector shown in FIG. 4 comprises the mixture of the phosphor ZnS:Ag,Cl with the neutron converter $^6$LiF as a neutron detecting scintillator which is coupled to the optical filter B370 which passes wavelengths shorter than about 450 nm and which in turn is coupled to a photomultiplier tube (R647P of HAMAMATSU PHOTONICS K.K.)

Figure 5:
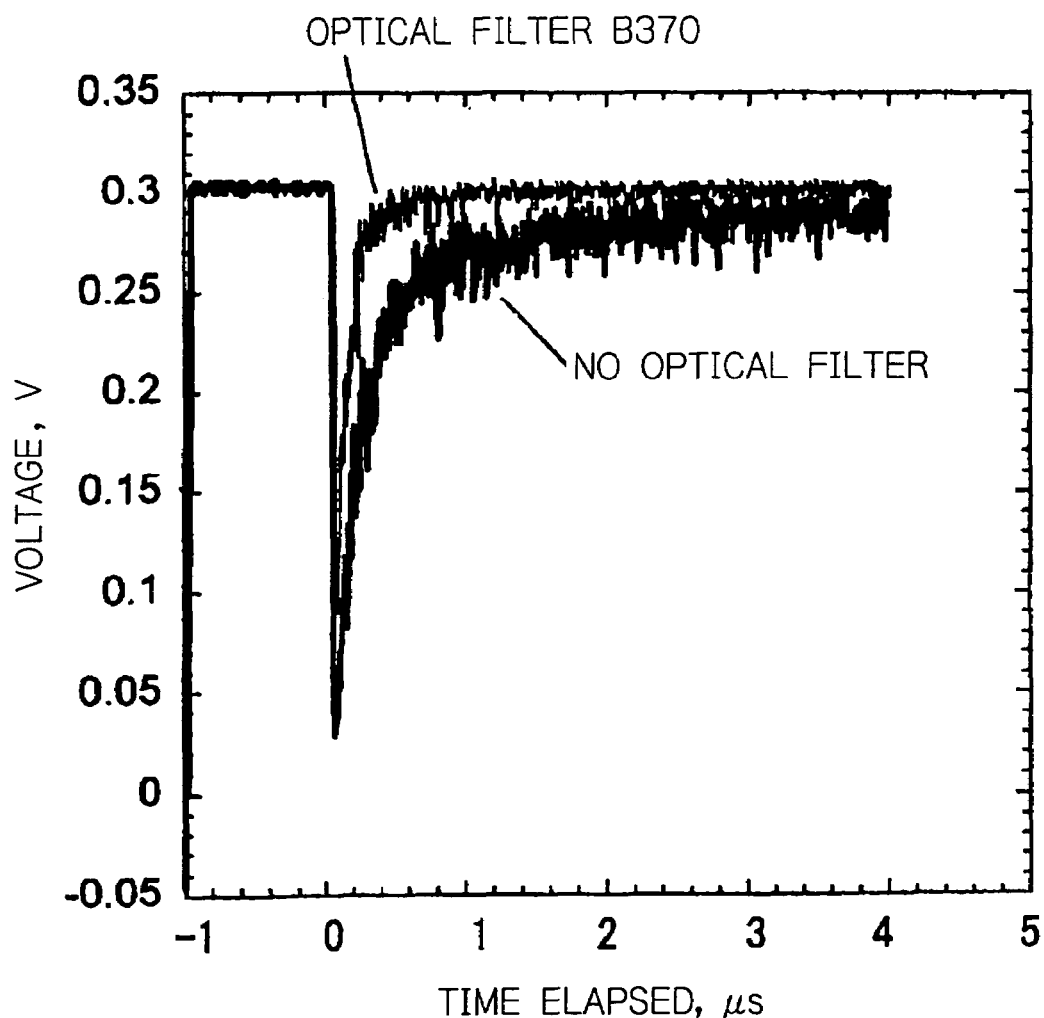
FIG. 5 is a graph comparing the waveforms of output signals from the photomultiplier tube in response to incident neutrons on ZnS:Ag,Cl between two cases, one using B370 as an optical filter and the other case using no optical filter.

The wavelength dependency of the life of fluorescence from ZnS:Ag,Cl was measured with a circuit shown in FIG. 2. The neutron detecting scintillator was prepared by mixing 60 mg/cm$^2$ of ZnS:Ag,Cl and 15 mg/cm$^2$ of the neutron converter $^6$LiF with an organic adhesive and applying the mixture to an aluminum plate. After installing the neutron detecting scintillator, the detector was irradiated with thermal neutrons from Am—Li. The signal waveforms of the fluorescence emitted from ZnS:Ag,Cl were measured with a digital oscilloscope. Thus, in Example 2, B370 passing shorter wavelengths than about 450 nm was used as an optical filter in order to shorten the decay time of fluorescence without unduly reducing its yield. As is clear from the signal waveforms shown in FIG. 5, the decay time of fluorescence was 238 ns, a considerable improvement over the value of 391 ns which was observed when no optical filter was used. For determining the life of fluorescence, 0.8 μs was used as the range for analysis.

EXAMPLE 3

In this example, a particle detector that uses the phosphor ZnS:Ag,Cl as a particle detecting element and which can detect particles as distinguished from gamma rays is described with reference to FIG. 6.

Figure 6:
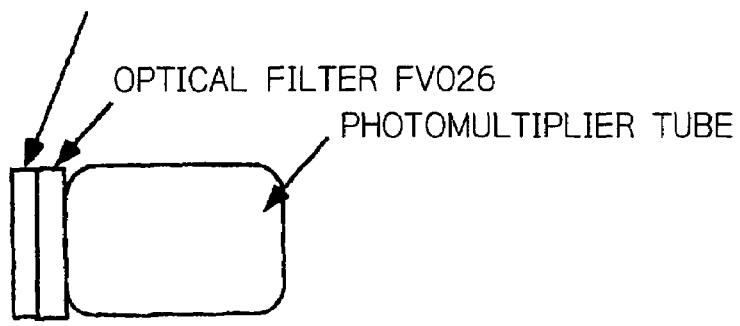
FIG. 6 shows a detector of particles as distinguished from gamma rays, comprising ZnS:Ag,Cl which is a particle detecting element coupled to an optical filter which in turn is coupled to a photomultiplier tube.

The particle detector shown in FIG. 6 is capable of detecting particles as distinguished from gamma rays and it comprises ZnS:Ag,Cl as a particle detecting element coupled to FV026 as an optical filter that passes wavelengths shorter than about 420 nm and which in turn is coupled to a photomultiplier tube.

Figure 7:
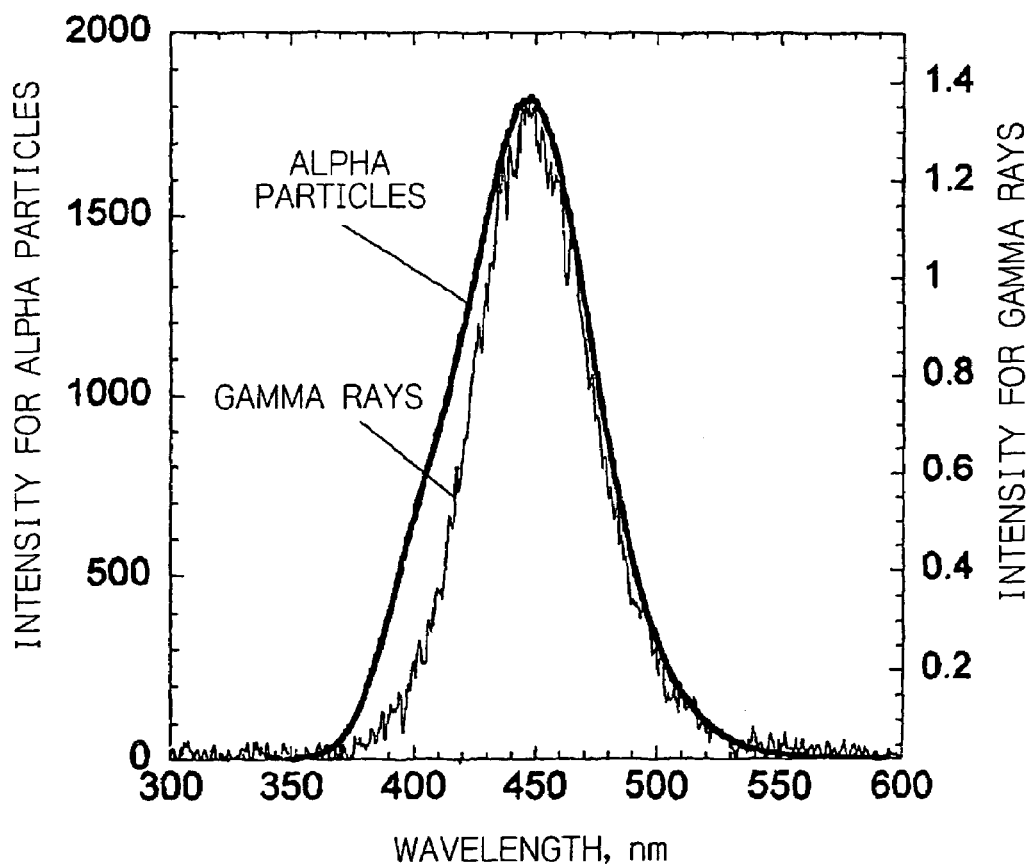
FIG. 7 is a graph comparing the wavelength spectra of fluorescence from the phosphor ZnS:Ag,Cl in response to alpha particles and gamma rays.

An experiment was made to confirm that the wavelength spectrum of fluorescence from ZnS:Ag,Cl changed between the cases of inputting alpha particles and gamma rays. The incident alpha particles were those of 5.4 MeV emitted from Am-241 and the incident gamma rays were those of 60 keV which were also emitted from Am-241 but which were made free from the effects of alpha particles by means of a thin sheet put on the surface of the source Am-241. The results of the experiment are plotted in FIG. 7; the data were normalized to eliminate the energy-dependent differences. It was thus confirmed that the component of emitted fluorescence which was in the region of short wavelengths had a lower fluorescence yield in response to gamma rays than to particles. The difference was particularly great at wavelengths shorter than 420 nm. This was why FV026 was employed as the optical filter in Example 3. The design of Example 3 enables detection of particles as distinguished from gamma rays.

EXAMPLE 4

Figure 8:
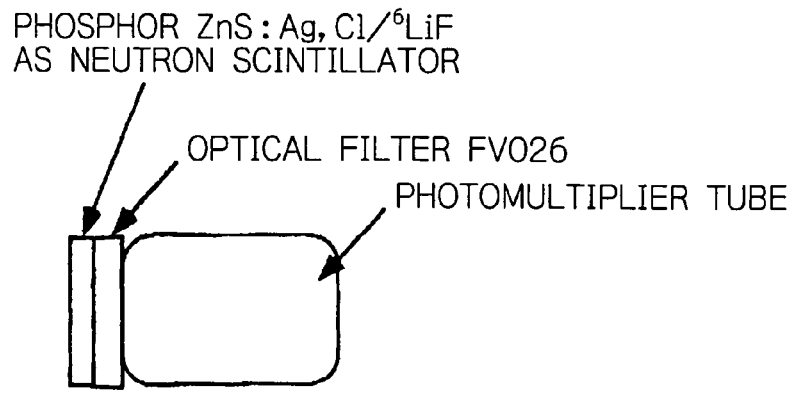
FIG. 8 shows a neutron detector that uses a mixture of the phosphor ZnS:Ag,Cl with the neutron converter $^6$LiF as a neutron detecting scintillator and which is capable of detecting neutrons as distinguished from gamma rays.

In this example, a detector of neutrons as distinguished from gamma rays is described with reference to FIG. 8. The detector uses a mixture of the phosphor ZnS:Ag,Cl with the neutron converter $^6$LiF as a neutron detecting element.

In view of the need to provide better transmission, 20 mg/cm$^2$ of ZnS:Ag,Cl and 5 mg/cm$^2$ of $^6$LiF were mixed with an organic adhesive and the mixture was applied to an aluminum plate. In Example 4, FV026 was employed as the optical filter since the difference in fluorescence yield was particularly great at wavelengths shorter than 420 nm. The design of Example 4 enables detection of neutrons as distinguished from gamma rays.

EXAMPLE 5

In this example, a particle detector is described with reference to FIG. 9. It can detect independently the long- and short-wavelength components of fluorescence emitted from the phosphor ZnS:Ag,Cl while simultaneously counting gamma rays or electron beams as they are distinguished from the incident particles.

Figure 9:
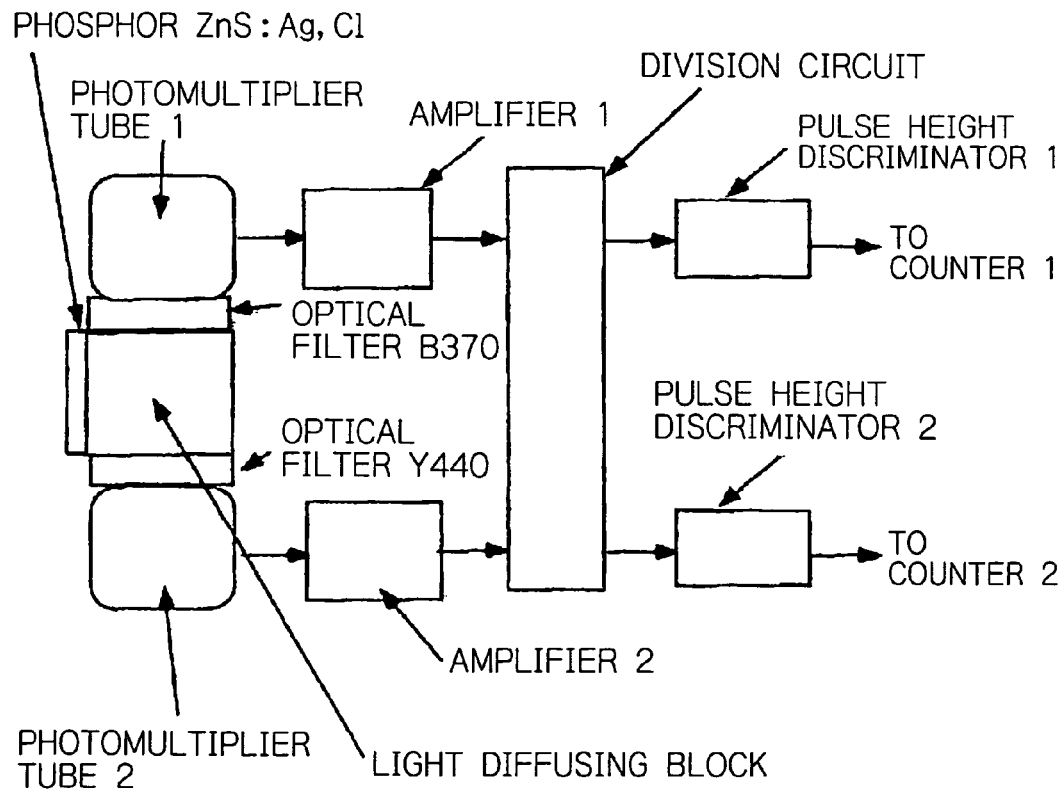
FIG. 9 shows the layout of a particle detector which detects independently the long- and short-wavelength components of the fluorescence from the phosphor ZnS:Ag,Cl while simultaneously counting gamma rays as they are distinguished from the incident particles.

The particle detector shown in FIG. 9 comprises the phosphor ZnS:Ag,Cl which is coupled to a light diffusing block that diffuses the fluorescence so that it can be detected at two sites, one of which is provided with the optical filter B370 that passes wavelengths shorter than about 450 nm for detecting the short-wavelength component and the other site is provided with optical filter Y440 that passes wavelengths longer than about 440 nm. Two photomultiplier tubes (R647P of HAMAMATSU PHOTONICS K.K.) are provided behind the respective optical filters and the ratio between the signals for the short- and long-wavelength components is determined with a division circuit. The output signal is passed through pulse height discriminators; since particles have high ratio and gamma rays have low ratio, the two kinds of radiation can be distinguished in counting.

EXAMPLE 6

In this example, a particle detector that is characterized by using a wavelength shifting fiber for selection of a particular fluorescence wavelength region is described with reference to FIG. 10.

Figure 10:
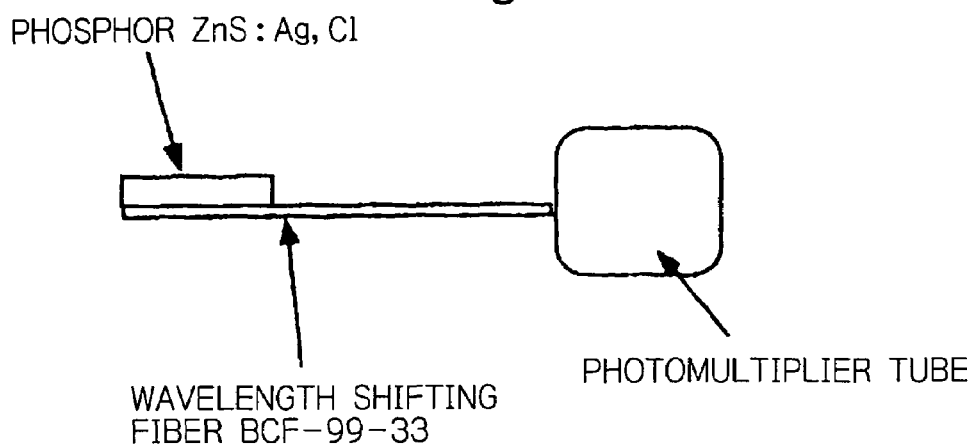
FIG. 10 shows diagrammatically a particle detector that uses a wavelength shifting fiber for selection of a particular fluorescence wavelength region.
Figure 11:
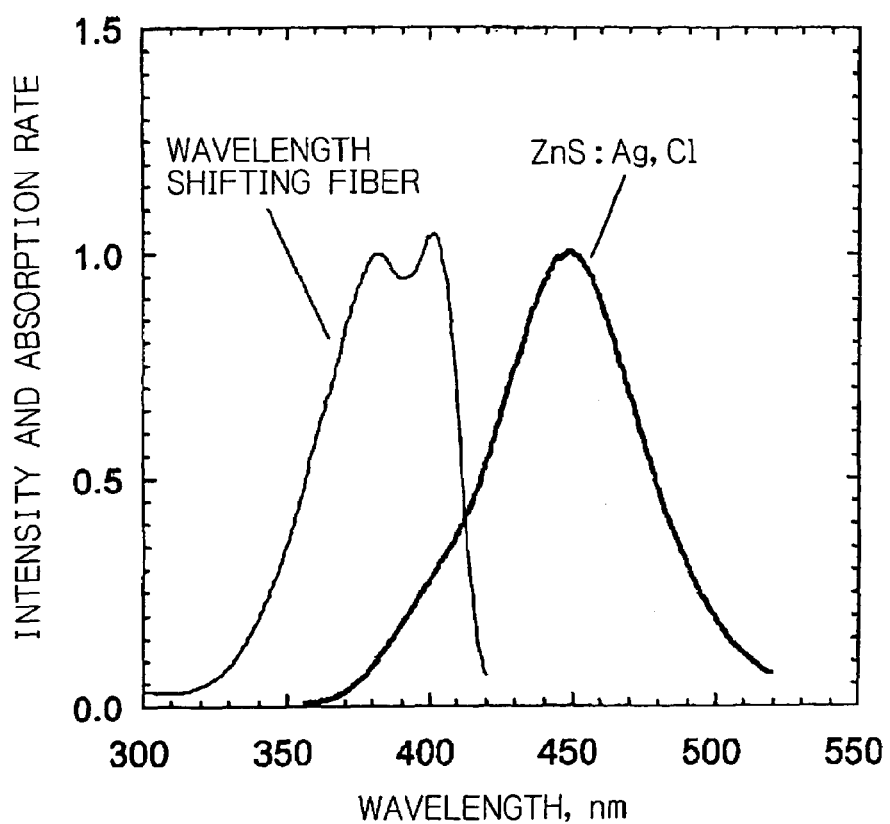
FIG. 11 is a graph comparing the short-wavelength region of a fluorescence spectrum from the phosphor ZnS:Ag,Cl with the absorption spectrum region of the wavelength shifting fiber BCF-99-33.
Figure 12:
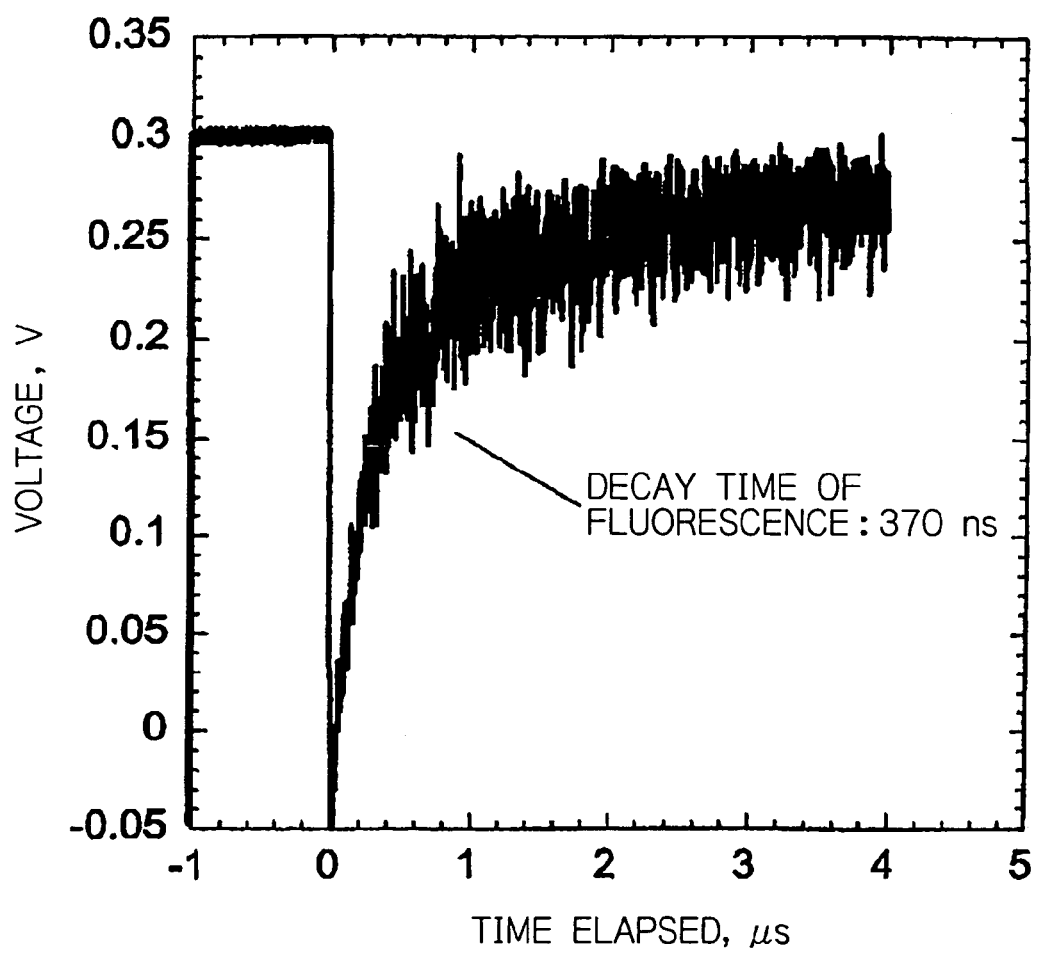
FIG. 12 is a graph showing the waveforms of output signals from the conventional phosphor ZnS:Ag,Cl in response to incident alpha particles.

The particle detector shown in FIG. 10 uses ZnS:Ag,Cl as a particle detecting element which is coupled to BCF-99-33, a wavelength shifting fiber custom made by Bicron, U.S.A. which has an absorption wavelength band between 380 nm and 420 nm. As shown in FIG. 11, the short-wavelength region of the fluorescence spectrum from ZnS:Ag,Cl is in good agreement with the absorption spectrum region of BCF-99-33, the particle detector of Example 6 undergoes reduced effects of gamma rays.

The invention claimed is:

1. A method for detecting long and short wavelength components of light emitted from a scintillator to simultaneously count gamma rays and alpha rays by using a particle detector having the scintillator made of ZnS:Ag,Cl, a light diffusing block coupled to the scintillator, two optical filters wherein a first optical filter passes a short wavelength component of the light having wavelengths between 350 nm and 450 nm and a second optical filter passing a long wavelength component of the light having wavelengths larger than 440 nm, two photomultipliers for measuring the short wavelength component and the long wavelength component, respectively, a division circuit for determining a ratio between signals output by the two photomultipliers, two pulse height discriminators for distinguishing between gamma rays and alpha rays based on the ratio, and two counters for counting alpha rays and gamma rays, comprising:

emitting light from the scintillator of ZnS:Ag,Cl in response to incident gamma rays and alpha rays;

diffusing the light by a light diffusing block coupled to the scintillator to detect the light at two sites;

filtering the light to pass the short wavelength component of the light having wavelengths between 350 and 450 nm at a first site using the first optical filter, and filtering the long wavelength component of the light having wavelengths larger than 440 nm at a second site using the second optical filter;

measuring the short wavelength component filtered at the first site with a first photomultiplier and the long wavelength component filtered at the second site with a second photomultiplier;

determining the ratio between signals output by the first photomultiplier and the second photomultiplier using the division circuit;

passing the ratio between signals through the pulse height discriminators to distinguish based on the ratio between the gamma rays having a lower ratio and the alpha rays having a larger ratio; and counting the alpha rays and the gamma rays using the counters, respectively.

* * * * *